Figure 1:
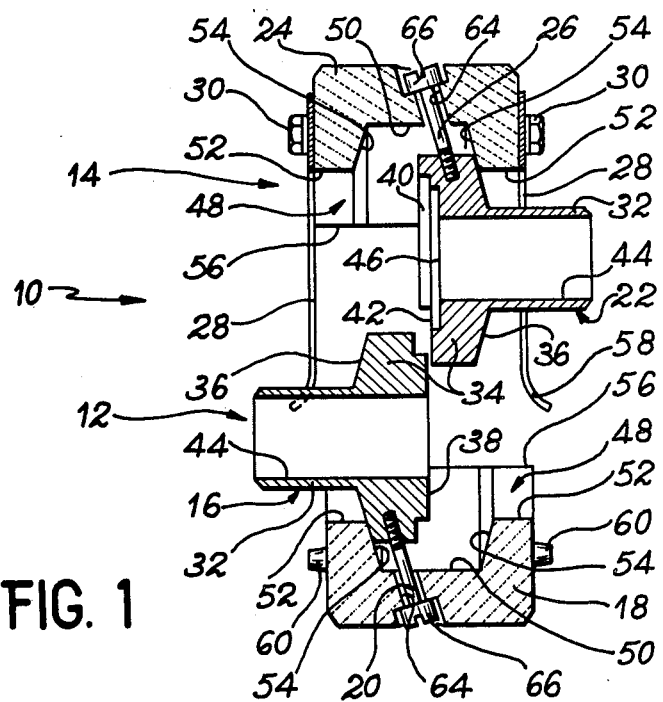

United States Patent [19]

Abbes et al.

[11] 4,327,942
[45] May 4, 1982

[54] SELF-LOCKING UNION

[75] Inventors: Claude Abbes, Saint Etienne; Raymond De Villepoix, Donzere; Christian Rouaud, Bourg Saint Andeol, all of France

[73] Assignee: Commissariat a l'Energie Atomique, Paris, France

[21] Appl. No.: 173,415

[22] Filed: Jul. 29, 1980

[30] Foreign Application Priority Data

Aug. 14, 1979 [FR] France .................................. 79 20691

[51] Int. Cl.³ ........................ F16L 23/00; F16L 37/26
[52] U.S. Cl. ..................................... 285/39; 285/325; 285/365
[58] Field of Search .................. 285/325, 39, 365, 366, 285/367, 407, 410, 411

[56] References Cited

U.S. PATENT DOCUMENTS 2,353,572  7/1944  Kuster et al. .................. 285/367 X
3,046,938  7/1962  Perkins ............................ 285/325 X
3,843,168  10/1974  Morrill et al. .................. 285/411 X

FOREIGN PATENT DOCUMENTS 843936   7/1952   Fed. Rep. of Germany ...... 285/365
2845167  4/1979   Fed. Rep. of Germany ...... 285/365
1503967  10/1967  France .............................. 285/366
858927   1/1961   United Kingdom .............. 285/325

Primary Examiner—Thomas F. Callaghan
Attorney, Agent, or Firm—Kerkam, Stowell, Kondracki & Clarke

[57] ABSTRACT

The present invention relates to a self-locking union or fitting adapted to be placed between two parts of a circuit to be connected, of the type comprising two end pieces adapted to be fixed to two parts of the circuit to be connected, two half-shells having internal truncated surfaces engaging complementary external truncated surfaces formed on the end pieces, to urge the latter into tight contact when the two half-shells are urged radially towards each other, wherein automatic locking means are disposed on the sides of the two half-shells, each of the half-shells being made fast with one of the end pieces by connecting means allowing a radial displacement of the half-shell with respect to the corresponding end piece, while maintaining the axis of the end piece parallel to that of the half-shell. The invention also relates to a tool particularly adapted to tighten a union or fitting of this type.

8 Claims, 3 Drawing Figures

SELF-LOCKING UNION

The invention relates to a self-locking union or fitting adapted to be placed between two parts of a circuit to be connected, such as two pipes or a pipe and a valve, as well as to a tool particularly adapted to tightening such a union.

More precisely, the invention relates to a union or fitting of the type comprising two end pieces adapted to be fixed to two parts of circuit to be connected, at least two half-shells having internal truncated surfaces engaging complementary external truncated surfaces formed on the end pieces, to urge these latter in tight contact when the half-shells are urged radially towards each other.

Numerous unions of this type are known, in which tightening is generally effected by means of screws or bolts passing through the shells along axes perpendicular to their plane of join. Due to this mode of tightening, unions of this type become virtually unusable when access to the circuit in which the union is to be inserted is difficult, particularly when the circuit is disposed behind a tight partition. Such a situation occurs in numerous domains, particularly in the nuclear industry.

The invention relates more precisely to a union or fitting of particularly simple design, which may be assembled and dismantled without difficulty even from a distance and when access to the two parts of the circuit to be connected is made through a wall allowing only radial access. The union according to the invention is, however, not limited to this particular application and may also be used when the circuit is easily accessible.

In accordance with the invention, a union or fitting of the type defined hereinabove is proposed, characterised in that it comprises automatic locking means disposed on the sides of the two half-shells, and in that each of the half-shells is rendered fast with one of the end pieces by connecting means allowing a radial displacement of the half-shell with respect to the corresponding end piece whilst maintaining the axis of the end piece parallel to that of the half-shell.

According to a particular embodiment of the invention, the connecting means may include screws or the like fixed to the end piece and passing through the half-shell along an axis located in a radial plane and parallel to the generatrix of the truncated surfaces of the half-shell and of the corresponding end piece contained in this plane.

According to another feature of the invention, the locking means comprise at least one spring leaf extending in a radial plane from one of the half-shells and having at least one hole in which engages a locking stud fixed to the other half-shell. The free end of the spring leaf is preferably curved away from the stud so as to facilitate introduction of the latter in the hole.

According to a further feature of the invention, in order to facilitate centering of the end pieces, one of the end pieces comprises a cylindrical projection adapted to engage in a complementary cylindrical recess formed in the other end piece, said recess being open radially to allow the introduction of the cylindrical projection in a direction perpendicular to the axis of the end pieces. In this case, at least one of the end pieces may comprise a housing adapted to receive an O-ring.

According to yet another feature of the invention, gripping surfaces adapted to receive a tightening tool are formed on each half-shell.

The invention also relates to a tool for tightening a self-locking union or fitting of the type defined hereinabove, this tool being characterised in that it comprises a first part provided with two arms whose ends are adapted to abut on two appropriate gripping surfaces formed on one of the half-shells, a second part bearing two articulated arms urged towards each other against inclined surfaces formed on the first part by elastic means, the ends of the articulated arms bearing two catches adapted to abut on two appropriate gripping surfaces formed on the other half-shell, and tightening means adapted to displace said parts with respect to each other in a radial direction with respect to the union.

The invention will be more readily understood on reading the following description with reference to the accompanying drawings, in which:

FIG. 1 is a view in transverse section of a union or fitting made in accordance with the teaching of the present invention, this union being shown in the position which it occupies before it is assembled.

Figure 2:
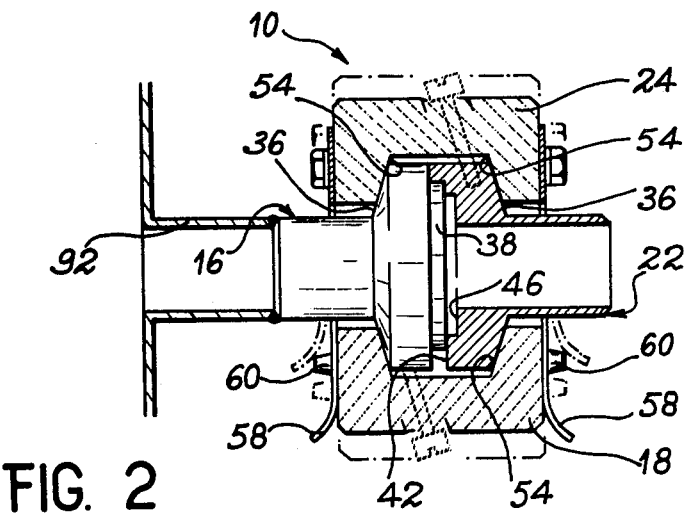
Figure 3:
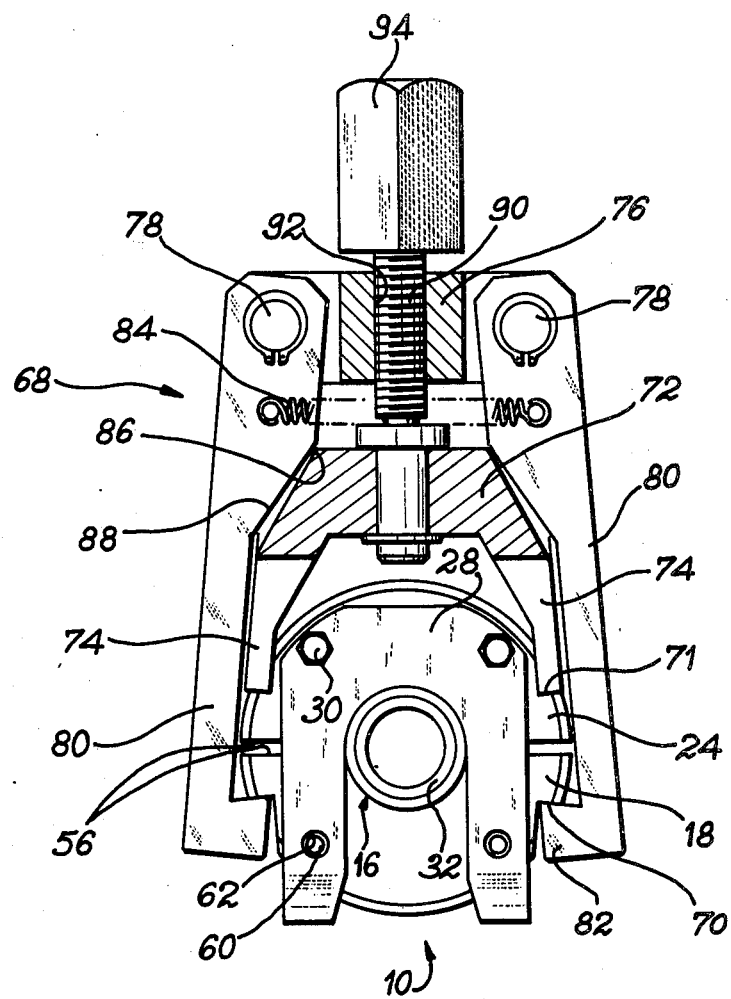

FIG. 2 is a view in transverse section of the union shown in FIG. 1, the half-shells and the spring leaves being shown in dashed and dotted lines in the position that they occupy in the course of assembly and in solid lines in the position that they occupy after tightening, and FIG. 3 is an end view of the assembled union shown in FIG. 2, and of a tool for tightening this union made according to the invention.

Referring now to the drawings, the union or fitting 10 shown in FIG. 1 comprises two sub-assemblies designated respectively by references 12 and 14. The sub-assembly 12 comprises an end piece 16 and a half-shell 18 connected by a screw 20, whilst sub-assembly 14 comprises an endpiece 22 and a half-shell 24 connected by a screw 26, as well as two spring leaves 28 fixed to the half-shell 24 by screws 30.

Each of the end pieces 16 and 22 comprises a tubular portion 32 provided to be tightly fixed, for example by welding, to two parts of a circuit to be connected, such as two pipes or a pipe and a measuring or control apparatus, for example a valve. Each of the end pieces 16 and 22 also comprises a portion 34 of larger diameter connected to the tubular portion 32 by a truncated surface 36. The end face of the portion of the endpiece 16 of larger diameter comprises a cylindrical projection 38 and the end face of the portion of the end piece 22 of larger diameter comprises a cylindrical recess 40 complementary of the projection 38. To allow the projection 38 to engage radially in the recess 40 as is taught by the assembly of the union according to the invention, the recess 40 is provided with a radial opening 42 whose width allows the passage of the projection 38. Each of the end pieces 16 and 22 is pierced with a passage 44 and a housing 46 is formed in the end face of the portion of the end piece 22 of larger diameter so as to receive an O-ring (not shown) ensuring tightness of the communication between the passages 44 when the union is assembled.

Each of the half-shells 18 and 24 presents a semi-cylindrical cavity 48 of which the central portion 50 is of a diameter slightly larger than the outer diameter of the portions 34 of larger diameter of the end pieces and whose ends 52 are of a diameter slightly larger than the outer diameter of the tubular portions 32 of the end pieces. The portions 50 and 52 of the recesses 48 are connected by semi-truncated surfaces 54 complementary of the surfaces 36 formed on the end pieces and whose spacing is determined so as to ensure a contact between the surfaces 36 and 54 both when the union is loosened and when it is tightened. Each of the half-shells 18 and 24 further defines a surface of join 56 disposed slightly recessed with respect to the axis of the cavity 48 formed in the corresponding half-shell, so as not to hinder tightening of the union.

As shown in particular in FIG. 3, each of the spring leaves 28 is in the form of a U of which the two arms surround the tubular portion 32 of the corresponding end piece to engage the end faces of the half-shell 18. The end 58 of each of these arms (FIG. 2) is curved away from the end faces of the shell 18 so as to allow these arms to rise on locking studs 60 projecting from the end faces of the half-shell 18. The arms of each of the spring leaves 28 may thus be displaced with respect to the half-shell 18 until the truncated locking studs 60 are opposite locking holes 62 formed in these arms. The diameter of the holes 62 is equal to the large diameter of the truncated studs 60, this enabling the spring leaves 28 to take their substantially flat rest position shown in FIG. 1 again by penetration of the studs 60 in the holes 62 and thus ensures locking of the union.

To facilitate assembly of the union, particularly when this union is adapted to be used in a spot of difficult access requiring remote controlled manoeuvring, the end piece 16 is made fast with the half-shell 18 by the screw 20 and the end piece 22 is rendered fast with the half-shell 24 by screw 26, so as to constitute the two sub-assemblies 12 and 14. The screws 20 and 26, which may be replaced by any similar connecting devices, are fixed respectively in the portion 34 of larger diameter of each of the end pieces 16 and 22 and pass freely through holes 64 formed in the half-shells, so that the head 66 of each of the screws renders each half-shell fast with the corresponding end piece, whilst allowing a radial displacement of the half-shells with respect to the end pieces in order to allow tightening and loosening of the union. The direction of this displacement is determined by the axes of the screws 20 and 26 which are located in a radial plane with respect to the end pieces 16 and 22, respectively, and which extend parallel to the generatrix of the closest truncated surface 36 located in this plane. The direction of the displacement of the half-shells with respect to the end pieces is also determined by the axes of the holes 64 which are both located in the median radial plane of the corresponding end piece and disposed parallel to the generatrix of one of the semi-truncated surfaces 54 located in this median plane. In addition, the distance separating the axes of the screws 20 and 26 from the generatrices closest to the surfaces 36 is substantially equal to the distance separating the axes of the holes 64 from the generatrices closest to the surfaces 54, so that the surfaces 36 of the end piece 16 is constantly in contact with the surface 54 of the half-shell 18 and the surface 36 of the end piece 22 is constantly in contact with the surface 54 of the half-shell 24. Due to the assembly thus effected of each of the sub-assemblies 12 and 14, the displacements of the half-shells 18 and 24 with respect to the end pieces 16 and 22 are such that the axes of the half-shells remain constantly parallel to the axes of the end pieces.

In order to facilitate assembly of the union by means of a tightening tool such as the tool 68 shown in FIG. 3, each of the half-shells 18 and 24 presents gripping surfaces 70 and 71, respectively constituted by notches made on the periphery of the half-shells. The gripping surfaces 70 and 71 are slightly inclined towards the axis of the union with respect to the surfaces of join 56 and they are disposed symmetrically with respect to a plane perpendicular to the surfaces 56 and passing through the axis of the union.

The tightening tool 68 comprises a first part 72 provided with two arms 74 whose ends abut against the gripping surfaces formed on one of the half-shells, such as the surfaces 71 formed on the half-shell 24, in the embodiment shown in FIG. 3. The tool 68 also comprises a second part 76 on which two arms 80 are articulated about two axes 78. The arms 80 are disposed outside the arms 74 and extend beyond the end thereof so as to abut, by means of two catches 82, on the gripping surfaces 70 formed on the other half-shell 18. A spring 84 urges the arms 80 towards each other so that the arms 80 cooperate by two inclined surfaces 86 with two opposite inclined surfaces 88 formed on the first part 72. The parts 72 and 76 are made fast with each other by tightening means constituted by a threaded rod 90 mounted to rotate in part 72 and received in a tapping 92 formed in part 76, the rotation of the rod 90 being controlled by means of a manoeuvring head 94 fixed rigidly on rod 90. As shown in FIG. 3, the axis of the threaded rod 90 is located in the plane of symmetry of the tool 68, this plane itself being merged with the plane of symmetry of the union, i.e. with the plane perpendicular to the surfaces of join 56 and passing through the axis of the union when the tool is placed thereon.

The union which has just been described is positioned by means of the tool shown in FIG. 3 and dismantled, in the following manner.

At least one of the end pieces 16 and 22 having been fixed in tight manner, for example by welding, to a part 92 (FIG. 2) of circuit to be connected such as a pipe or control or measuring apparatus, the two sub-assemblies 12 and 14 are disposed radially opposite each other as illustrated in FIG. 1 and the axes of the end pieces 16 and 22 are immediately aligned as illustrated in FIG. 2 by radially fitting the cylindrical projection 38 in the cylindrical recess 40 through the radial opening 42. Each of the half-shells 18 and 24 is then maintained radially spaced from the end pieces under the action of the spring leaves 28 whose curved ends 58 abut against the locking studs 60. This position is shown in dashed and dotted lines in FIG. 2.

The actual tightening is effected by means of the tool 68 whose arms 80 are firstly spaced apart against the action of the spring 84 by turning the manoeuvring head 94 in the direction corresponding to the bringing together of the parts 72 and 76 with respect to the position shown in FIG. 3. This spacing apart of the arms 80, obtained due to the cooperation of the inclined surfaces 86 and 88, is sufficient to allow the passage of the catches 82 beyond the plane of join of the union. The tool 68 may thus be positioned so that the ends of the arms 74 abut on the gripping surfaces 71. The tool 68 is then positioned and tightened by rotating the threaded rod 90 by its manoeuvring head 94 in the direction corresponding to the spacing apart of parts 72 and 76. The catches 82 thus abut on the gripping surfaces 70 formed on the lower half-shell, with reference to this Figure, and the effect of continuing to rotate the threaded rod 90 is to bring half-shells 18 and 24 towards each other. The consequence of this bringing together is that the end pieces 16 and 22 are urged towards each other due to the cooperation of the truncated surfaces 36 with the truncated surfaces 54. In the course of this bringing together, the end face of the portion 34 of larger diameter of the end piece 16 crushes the O-ring (not shown) placed previously in the housing 46, so that the tightness is ensured between the passages 44 and between the corresponding parts of the circuit to be connected. The dimensioning of the different parts of the union is such that the spring leaves 28 which moved away from the end faces of the half-shell 18 due to their cooperation with the locking studs 60 in the course of the tightening of the union by the tool 68, then come into the position shown in solid lines in FIG. 2, in which the studs 60 are opposite the holes 62 formed in the spring leaves and penetrate therein in order to effect locking of the union.

The tool 68 may be dismantled simply by urging the threaded rod 90 in rotation in the direction of loosening in order to displace part 72 towards part 76, this causing the arms 80 to move apart and releases the catches 82 from the gripping surfaces 70 formed on the corresponding half-shell. The tool 68 may then be removed without difficulty.

The union according to the invention may also be dismantled very simply by means of another tool (not shown) for separating the spring leaves 28 from the end faces of the half-shell 18, so as to release the studs 60 from the holes 62, this tool being provided with projecting elements inserted between the opposite surfaces 56 of the half-shells in order to move the latter away from each other.

It will be noted that the union according to the invention, particularly when it is positioned by means of the tool shown in FIG. 3, is particularly adapted to connecting two parts of a circuit disposed in a spot of particularly difficult access, such as a circuit disposed inside an enclosure or behind a tight partition. In fact, this union is simply composed of two sub-assemblies which can be easily positioned, tightened and loosened through a single radial access of very reduced dimensions. However, the invention is not limited to this type of application and may also be used for connecting two parts of a circuit having no problem of accessibility. In this case, it is then possible to eliminate the screws connecting the end pieces and the half-shells to form two sub-assemblies and to eliminate or modify the gripping surfaces 70 and 71 as a function of the mode of tightening used.

Of course, the invention is not limited to the embodiment described by way of example, but covers all the variants thereof. The means for locking the union, constituted by the spring leaves 28 and the studs may thus be modified, the studs being for example borne by the spring leaves and the holes then being made in the half-shells, each half-shell also being able to bear one or more spring leaves cooperating with a stud or a hole formed on the other half-shell.

What is claimed is:

1. In a union or fitting of the type comprising two end pieces adapted to be fixed to two parts of circuit to be connected, two half-shells having internal truncated surfaces engaging complementary external truncated surfaces formed on the end pieces, to urge the latter into tight contact when the two half-shells are urged radially towards each other,
   automatic locking means are disposed on the sides of the two half-shells, each of the half-shells being made fast with one of the end pieces by connecting means allowing a radial displacement of the half-shell with respect to the corresponding end piece, whilst maintaining the axis of the end piece parallel to that of the half-shell.

2. The union of claim 1, wherein the connecting means comprise screws or the like, fixed to the end piece and passing through the half-shell along an axis located in a radial plane parallel to the generatrix of the truncated surfaces of the half-shell and of the corresponding end piece contained in this plane.

3. The union of claim 1, wherein the locking means comprise at least one spring leaf extending in a radial plane from one of the half-shells and having at least one hole in which engages a locking stud fixed to the other half-shell.

4. The union of claim 3, wherein the free end of the spring leaf is curved away from the stud so as to facilitate introduction of the latter in the hole.

5. The union of claim 1, wherein one of the end pieces comprises a cylindrical projection adapted to engage in a complementary cylindrical recess formed in the other end piece, said recess being open radially to allow the introduction of the cylindrical projection in a direction perpendicular to the axis of the end pieces.

6. The union of claim 5, wherein at least one of the end pieces comprises a housing adapted to receive an O-ring.

7. The union of claim 1, wherein gripping surfaces adapted to receive a tightening tool are formed on each half-shell.

8. A tool for tightening self-locking union of claim 7, comprising a first part provided with two arms whose ends are adapted to abut on two appropriate gripping surfaces formed on one of the half-shells, a second part bearing two articulated arms urged towards each other against inclined surfaces formed on the first part by elastic means, the ends of the articulated arms bearing two catches adapted to abut on two appropriate gripping surfaces formed on the other half-shell, and tightening means adapted to displace said parts with respect to each other in a radial direction with respect to the union.

* * * * *